Patented July 11, 1950

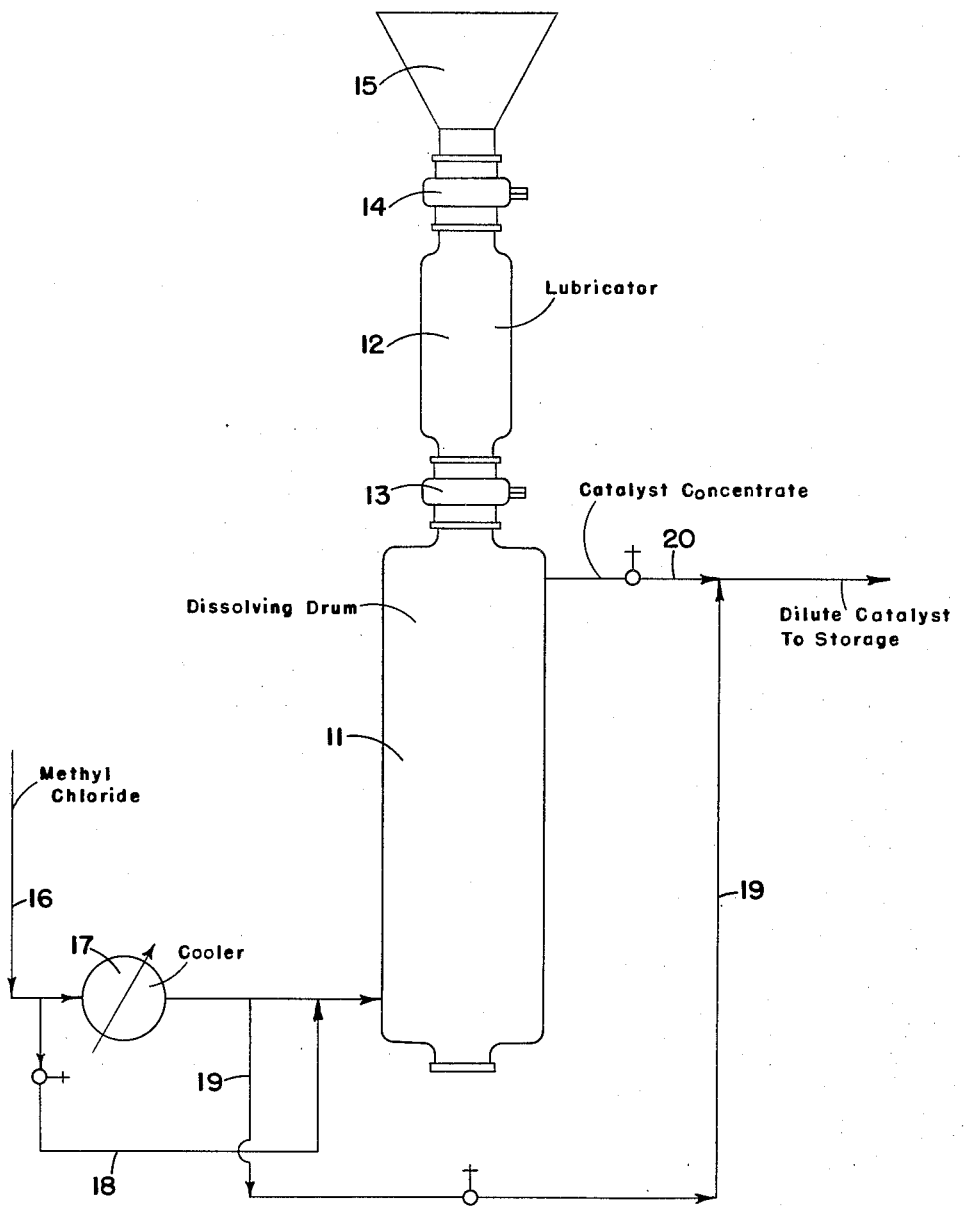

2,515,138

UNITED STATES PATENT OFFICE 2,515,138

METHOD FOR PREPARING A FRIEDEL-CRAFTS CATALYST

Henry G. Schutze, Goose Creek, Tex., assignor, by mesne assignments, to Standard Oil Development Company, Elizabeth, N. J., a corporation of Delaware Application July 22, 1946, Serial No. 685,301

2 Claims. (Cl. 252—429)

The present invention is directed to a method for preparing a Friedel-Crafts type catalyst.

In many chemical reactions it is common to catalyze the reaction by a Friedel-Crafts type catalyst. A typical catalyst for this purpose is aluminum chloride, although it will be understood that other metallic halides are active catalytic agents for many chemical reactions.

When conducting commercial operations on a large scale it is convenient to use a continuous process if such a process is at all feasible for the reaction to be employed. In such continuous processes it is desirable to maintain the operating conditions substantially uniform both in order to obtain a uniform product and also for convenience in controlling the various phases of the process. When such a process involves the use of a Friedel-Crafts type catalyst it is desirable for the catalytic material employed to be substantially uniform in catalytic activity.

As an example of a commercial reaction involving the use of a Friedel-Crafts type catalyst may be mentioned the copolymerization of diolefins to obtain a vulcanizable polymer. More particularly may be mentioned the copolymerization of isobutylene and isoprene in the presence of a Friedel-Crafts type catalyst at low temperatures to obtain the polymer known as Butyl rubber. In such commercial operations it is necessary to employ a solution of catalyst to obtain a product of desired characteristics; for example, the Friedel-Crafts type catalyst may be dissolved in alkyl halide to form a dilute solution and the solution added to the liquid reactants. The alkyl halide is subsequently recovered from the product and recycled. Such recovered alkyl halide necessarily contains contaminants and the contaminants cause substantial variations in the activity of the catalytic solution produced by dissolving the Friedel-Crafts type catalyst therein.

It is an object of the present invention to devise a method for preparing a solution of Friedel-Crafts type catalyst in a continuous manner whereby a solution of substantially uniform catalytic strength is obtained. More particularly, it is an object of the present invention to devise a method for preparing a solution of Friedel-Crafts type catalyst in a continuous manner whereby a solution of substantially uniform strength is obtained, the method requiring a relatively small amount of stirring equipment and tanks for storing solvents and solution.

The present invention may be described briefly as involving arranging solid Friedel-Crafts type catalyst in a bed, contacting the bed with solvent contaminated with a minor portion of contaminants to obtain a catalyst solution in such amounts as to be rapidly consumed in the process requiring the catalyst and to replenish the bed with solid Friedel-Crafts catalyst after no more than a minor portion of the charged catalyst has been dissolved from the bed whereby a solution of substantially uniform activity is obtained.

Seemingly small variations in the operating conditions of a process involving the use of a Friedel-Crafts type catalyst cause relatively great changes in the activity of the catalytic material. The substantially pure Friedel-Crafts type catalyst, such as aluminum chloride, appears to comprise more readily soluble portions or catalyst activators which are leached from the solid metal halide whereby the solution formed on contact of a fresh charge of the metal halide with solvent is more active than portions subsequently dissolved. Such activating materials may be formed by contact of the catalyst with moisture present in the air; that is to say, if a dissolving drum is recharged during a rain storm or when the absolute humidity of the air is high, the resulting catalyst is more highly active than when less moisture is present in the atmosphere. Variations in the activity of the solutions prepared are also brought about by variations of the impurities in the solvent. For example, if an alkyl halide such as methyl chloride is employed as the solvent and is recycled through a system for making vulcanizable polymer, the solvent recovered may be contaminated with minor amounts of moisture and unsaturated hydrocarbons such as isobutylene. These materials in the presence of a catalyst such as aluminum chloride may react or polymerize to form contaminants such as hydrogen chloride and di-isobutylene which are potent catalyst activators. It will accordingly be seen that the solution of Friedel-Crafts type catalyst will have an activity which is a function of the quantity of moisture absorbed during the charging of the catalyst drum and a function of the activating impurities present in the solvent employed in making up the solution.

The activity of the solution is also a function of the temperature at which the solution is formed, inasmuch as low temperatures of solution favor the production of high molecular weight polymers. In other words, the activating effect of unsaturated hydrocarbon contaminants in the solvent may be diminished by the selection of suitably low temperatures.

In accordance with the present invention a solution of Friedel-Crafts type catalyst suitable for employment in a continuous process is formed by providing a bed of solid Friedel-Crafts type catalyst, said bed comprising minor amounts of material of higher catalytic activity than the remainder of the bed, and contacting the bed with solvent to form a solution. The bed is replenished at frequent intervals whereby the amount of solid material added to the bed during the recharging operation is of the order of 5 to 20% of the total amount of Friedel-Crafts type catalyst in the bed.

By way of example, it is preferred to form a bed of solid Friedel-Crafts type catalyst in a dissolving drum with the amount of catalyst making up the bed in an amount within the range of the catalyst requirement from one to four days. Solvent is contacted with the catalyst bed to dissolve catalyst therefrom and additional catalyst is added thereto at regular intervals no more than a few hours apart. If contaminants such as water or unsaturated hydrocarbons, either alone or in admixture, are present in an amount no greater than 50 parts per million, a solution temperature in the range of 50° to 100° F. may be used satisfactorily. However, if the contaminants are present in an amount greater than 50 parts per million the solution temperature should be no greater than 50° F. and with larger amounts of contaminants the solution temperature should be correspondingly decreased.

As an example illustrating the practice of the present invention, a dissolving drum having a total capacity of 1800 lbs. of aluminum chloride is filled to capacity. Approximately 600 lbs. of aluminum chloride daily is employed as catalyst. In accordance with the present invention, 100 lbs. of aluminum chloride is charged to the dissolving drum at intervals of 4 hours. In this manner the plant catalyst efficiency is maintained within the range of 400 to 600 lbs. of polymer per lb. of aluminum chloride.

The invention will now be described in greater detail by reference to the drawing, in which the single figure is in the form of a diagrammatic flow sheet.

In the drawing a dissolving drum 11 has attached thereto at its upper end a lubricator consisting of a vessel 12, a valve 13 between the lower end of the lubricator and drum 11, a valve 14 at the upper end of vessel 12 and funnel 15 secured to valve 14.

A line 16 for supplying an alkyl halide solvent such as methyl chloride has arranged therein a cooler 17. A bypass line 18 is arranged to bypass a portion of a solvent around the cooler in order to obtain a suitable temperature. Line 16 discharges into the lower end of dissolving drum 11. A branch line 19 connects to line 16 between the cooler and dissolving drum and is connected to outlet line 20 discharging from the upper end of the dissolving drum whereby the solution formed in the drum may be suitably diluted to obtain a solvent solution for use in a continuous process, as in the copolymerization of mixtures of diolefin.

Before starting up the process the drum 11 is filled to normal capacity with solid Friedel-Crafts type catalyst. Solvent chilled to a suitable temperature is then discharged into the lower end of drum 11 through line 16 and resultant solution is withdrawn from outlet line 20. After a minor portion of the solid catalyst has been dissolved from a bed, for example, 5 to 20% of the catalyst originally making up the bed, additional catalyst is added to the bed without interrupting the flow of catalyst solution. In order to add makeup Friedel-Crafts type catalyst to drum 11 valve 13 must be in a closed position and with valve 14 in open position the solid makeup catalyst is passed through funnel 15 and valve 14 into container 12. Valve 14 may then be closed and valve 13 opened to allow the catalyst to drop from container 12 into drum 11. Catalyst is added in this manner until the drum contains the amount initially present therein. Solvent continues to pass through the drum to dissolve catalyst therefrom until catalyst in an amount within the range of 5 to 20% of the total amount of material originally present in drum 11 has again been dissolved, when the cycle may be repeated.

As heretofore stated, it is desirable to adjust the solution temperature as a function of the impurities present in the dissolving drum in order to obtain a catalyst of uniform activity. The solution temperatures to be employed with differing amounts of contaminating agents are set out in the table below.

Table

| H³O Content | Unsaturated hydrocarbon Content | Temperature of— |
|---|---|---|
| P.P.M. | P.P.M. | °F. |
| 0-50 |  | 50-100 |
| 50-150 |  | 0-50 |
| 150-300 |  | -20 to 50 |
| Above 300 |  | -20 to -80 |
|  | 0-50 | 50-100 |
|  | 50-150 | 0-50 |
|  | 150 and above | -80 to -20 |

It will be seen that I have disclosed a method for forming catalyst solution which requires a relatively small amount of equipment and solvent with respect to the daily requirements of catalyst. It will also be seen that the catalytic activity of the solution may be maintained substantially constant in a simple procedure requiring little attention from the operator.

Having fully described and illustrated the practice of the present invention, what is desired to be claimed as new and useful and is desired to be secured by Letters Patent is:

1. A method for preparing a solution of aluminum chloride catalyst of uniform activity which comprises the steps of forming a bed of solid raw aluminum chloride catalyst containing aluminum chloride and activational material for increasing the catalytic activity of the aluminum chloride in the solution, passing methyl chloride solvent contaminated with up to 300 parts per million of materials of the group of unsaturated and oxygenated organic compounds through the bed of the catalyst at a temperature in the range of —80° to 100° F. to form a solution of aluminum chloride catalyst containing aluminum chloride and activational material, continuing to pass the methyl chloride solvent through the bed while the bed contains activating material until a minor portion of the solid raw aluminum chloride catalyst has been dissolved therefrom, and adding solid raw aluminum chloride catalyst containing aluminum chloride and activational material to the bed in an amount substantially equal to that dissolved while continuing to dissolve solid raw aluminum chloride catalyst from the bed.

2. A method for preparing a solution of aluminum chloride catalyst of uniform activity suitable for use in the low temperature polymerization of olefins which comprises the steps of forming a bed of solid raw aluminum chloride catalyst containing aluminum chloride and activational material for increasing the catalytic activity of the aluminum chloride in the solution, passing cooled methyl chloride containing up to 300 parts per million of contaminant selected from the group consisting of unsaturated and oxygenated organic compounds through the bed at a temperature in the range of −80° to 100° F. to form an active solution of aluminum chloride catalyst containing aluminum chloride and activational material, adding additional solid raw aluminum chloride catalyst containing aluminum chloride and activational material to said bed when a minor portion of the bed has been dissolved to replenish that dissolved by the methyl chloride, and maintaining the catalytic activity of the active solution of catalyst substantially uniform by increasing the temperature of the cooled methyl chloride from 50° to 100° F. proportionately as the amount of contaminants in the methyl chloride decreases from 50 parts per million to 0 parts per million and decreasing the temperature of the cooled methyl chloride from 50° to −80° F. proportionately as the amount of contaminants in the methyl chloride increases from 50 parts per million to 300 parts per million.

HENRY G. SCHUTZE.

REFERENCES CITED

The following references are of record in the file of this patent:

UNITED STATES PATENTS

| Number | Name | Date |
| --- | --- | --- |
| 2,251,515 | Curll | Aug. 5, 1941 |
| 2,276,893 | Thomas et al. | Mar. 17, 1942 |
| 2,301,615 | Chenicek et al. | Nov. 10, 1942 |
| 2,356,128 | Thomas et al. | Aug. 22, 1944 |
| 2,383,627 | Thomas et al. | Aug. 28, 1945 |
| 2,408,187 | Atwell | Sept. 24, 1946 |